(12) United States Patent
Miller et al.

(10) Patent No.: US 7,941,246 B2
(45) Date of Patent: May 10, 2011

(54) AUTOMATIC GENERATION CONTROL AUGMENTATION FOR WIND PLANT INTEGRATION

(75) Inventors: Nicholas Wright Miller, Delmar, NY (US); Kara Clark, Glenville, NY (US)

(73) Assignee: General Electric Company, Schenectady, NY (US)

( * ) Notice: Subject to any disclaimer, the term of this patent is extended or adjusted under 35 U.S.C. 154(b) by 371 days.

(21) Appl. No.: 12/040,376

(22) Filed: Feb. 29, 2008

(65) Prior Publication Data

US 2009/0218819 A1    Sep. 3, 2009

(51) Int. Cl.
G05D 3/12 (2006.01)
G05D 5/00 (2006.01)
G05D 9/00 (2006.01)

(52) U.S. Cl. .......... 700/287; 700/286; 700/291; 290/44; 290/55; 322/35

(58) Field of Classification Search .................. 700/286, 700/291; 290/44, 55; 322/35
See application file for complete search history.

(56) References Cited

U.S. PATENT DOCUMENTS

| | | | |
|---|---|---|---|
| 7,013,203 B2 | 3/2006 | Moore et al. | |
| 7,085,660 B2 | 8/2006 | Mansingh et al. | |
| 7,298,059 B2 * | 11/2007 | Delmerico et al. | 307/85 |
| 7,345,373 B2 | 3/2008 | Delmerico et al. | |
| 7,346,462 B2 | 3/2008 | Delmerico | |
| 7,437,216 B2 * | 10/2008 | Riesberg et al. | 700/286 |
| 7,505,833 B2 | 3/2009 | Delmerico et al. | |
| 7,622,816 B2 * | 11/2009 | Stahlkopf | 290/44 |
| 7,679,215 B2 * | 3/2010 | Delmerico et al. | 307/57 |
| 2005/0077881 A1 * | 4/2005 | Capp et al. | 322/29 |
| 2006/0132993 A1 * | 6/2006 | Delmerico et al. | 361/20 |
| 2008/0111380 A1 | 5/2008 | Delmerico et al. | |
| 2009/0177333 A1 | 7/2009 | Delmerico et al. | |

OTHER PUBLICATIONS

"Wind Farm Control Software Structure", Svensson et al, Workshop on Transmission Networks for Offshore Wind Farms, Apr. 2002.*
"Grid Connection and Remote Control for the Horns Rev 150 MW Offshore Wind Farm in Denmark", Chrsitiansen et al, International Workshop on Transmission Networks for Offshore Wind Farms, Mar. 2001, pp. 1-11.*
"System Control of Large Scale Wind Power by Use of Automatic Generation Control (AGC)", Gjengedal, Quality and Security of Electric Power Delivery System and PES International Symposium, 2003, pp. 15-21.*
B.J. Kirby, J. Dyer, C. Martinez, Dr. Rahmat A. Shoureshi and R. Guttromson, J. Dagle, "Frequency Control Concerns in the North American Electric Power System", Dec. 2002, ORNL/TM-2003/41, Oak Ridge National Laboratory, Oak Ridge, TN 37831-6070 for the U.S. Dept. of Energy.
Chen-Ching Liu and Guang Li, "Available Transfer Capability Determination", Third NSF Workshop on US-Africa Research and Education collaboration, Abuja, Nigeria, Dec. 13-15, 2004, University of Washington.
Alec Brooks and Tom Gage, "Integration of Electric Drive Vehicles with the Electric Power Grid—a New Value Stream", AC Propulsion, EVS 18 Berlin, 2001.
Y. Wan, National Renewable Energy Laboratory and J.R. Liao, Western Farmers Electric Cooperative, "Analysis of Wind Energy Impact on WFEC System Operations", Conference Paper, NREL/CP-500-39477, Mar. 2006.
Philip Wong Too, Senior Engineer, Garrad Hassan Pacific, "Submission on Tactical Wind Generation Project", Jul. 13, 2005.

* cited by examiner

Primary Examiner — Michael D Masinick
(74) Attorney, Agent, or Firm — McNees Wallace & Nurick LLC

(57) ABSTRACT

An automatic generation control (AGC) augmentation system and method for wind power plant integration for controlling the power contribution to a grid by the wind plant is disclosed that provides for the calculation of the area control error (ACE) by actively communicating to the wind plant ramp rate limits and curtailment requests contributing to the ACE calculation. The augmented control of the ACE minimizes the amount of lost energy production by the wind plant.

6 Claims, 5 Drawing Sheets

AUTOMATIC GENERATION CONTROL AUGMENTATION FOR WIND PLANT INTEGRATION

FIELD OF THE INVENTION

The present invention is directed generally to wind power generation, and more particularly to a system and method for bilateral and/or unilateral communication between a wind plant control system and an energy management system to improve grid operation.

BACKGROUND OF THE INVENTION

A wind power generation system generally includes a wind plant having a plurality of wind turbine generators supplying power to an electrical grid. Collective power output of the wind plant is greatly influenced by wind conditions on individual wind turbine generators. Grid operators often have other power resources, such as thermal power plants to balance power generation and consumption, thus accommodating variability in wind conditions during intermittent wind conditions. Thermal power plants may include, for example, coal and gas fired stations. Power fluctuation of wind farms due to gusty or low wind conditions is usually dealt with by grid operators by adjusting power output of these thermal power plants to provide sufficient power to match demands.

Electrical grids transmit and distribute energy from power plants to industrial, commercial, residential and other end-users. Grids must be operated to maintain the power balance and frequency of the grid within set range limits. Operating within the predetermined range assures that power is available to end users within the grid, as well as possibly allowing for power exchange with another grid.

In order to operate the grid within an established range, the operator of the grid must be aware of the amount of power consumed by end-users, and that generated by power plants and exchanged with neighboring systems. The operator modifies total power generation to match the changing levels of power consumption and exchange. The operator accomplishes this by instructing power plants to increase or decrease their power output.

The grid operator provides a centralized control known as automatic generation control (AGC), which instructs a participating subset of individual power generators to adjust their output to maintain a predetermined frequency and power exchange, even as power consumption varies. Grid operators must continuously fine-tune the match between power generation, grid import and grid export and power consumption. This grid regulation requires power plants that can ramp power up or down under real time control of the grid operator. Regulation is used to assure that the grid operation in the grid-operator's control area complies with a performance standard required by a power grid oversight agency. The measure of quality of grid operation in a control area is called area control error (ACE).

ACE is a combination of the control area's deviation from scheduled net import or export of power and the control area's contribution to power variation needed to maintain the grid frequency at its target level of 60 Hz in the US. Other grid frequencies are maintained in different parts of the world. The magnitude of ACE and the power needed to keep ACE within prescribed limits is small relative to the total power consumed in the control area. For example, in California, it is typically about 0.5%.

As a guide to performance, the North American Reliability Council (NERC) has defined minimum Control Performance standards (CPS1, CPS2) that quantify performance as a relationship between ACE and interconnection frequency. Rapid and widely varying loads can adversely affect a control area's control performance by NERC's control performance standards, CPS1 and CPS2. For operational reliability of the interconnection, certain penalties can be imposed on a control area when it fails to comply with NERC's standards.

When wind power is added to a system control area, the system must respond to fluctuations of both system load and wind power. Fluctuations from wind power may occur rapidly. However, it is often difficult to change power output of thermal power plants as rapidly to compensate for the contribution from wind energy. The speed at which thermal power generators can increase or decrease their power output is limited by the physical capability of various plant components. The limit on increasing power output may be different from the limit on decreasing power output. The nature of wind generation is such that a wind plant can be ordered to decrease power output, but not increase power output, since the wind is uncontrollable. Therefore, the ability to decrease wind generation may be of use when thermal power plants are decreasing at their fastest rate, and that rate is not sufficient to meet the grid operator's needs.

Grid operators must continuously vary power production from power plant generators in order to maintain a balance between load and generation, and thereby hold constant system frequency and power exchange with neighboring grids, also referred to as power ties. Relatively fast, centralized control by the AGC instructs participating individual generators to adjust their output. Wind generation has not typically participated in AGC. In power system grids for which a significant fraction of the total generation is wind, grid control objectives for maintaining frequency may be violated due to an inability of the individual generators participating in AGC to respond adequately.

Additionally, it is important to operate the wind plant at peak energy production to reduce cost to the wind plant operator. If wind plant power generation must be curtailed so as not to exceed or violate energy contribution limits to the grid, the grid operator would like to be provided with as much information as possible so as to minimize lost energy production while still operating the grid within system frequency and power exchange limits.

It is therefore, desirable to provide a system and method for sharing limited control and/or information of wind plant active power functions with the utility grid AGC to both improve the control the grid operator has over maintaining grid operations within set guidelines and to reduce wind energy production loss at the wind plant.

SUMMARY OF THE INVENTION

A first aspect of the present invention includes a method for allowing wind plant(s) to participate in AGC operation under selected conditions while minimizing lost wind energy production.

Another aspect of the present invention includes a method for augmenting an automatic generation control of an energy management system utility grid including the steps of establishing a bilateral communication between a utility grid energy management system and a wind plant control system of a wind plant, communicating a ramp rate signal from an automatic generation control of the utility grid energy management system in response to an area control error augmentation calculation performed by the automatic generation control to a wind plant supervisory control system, and communicating wind plant control active power functions from the wind plant control system to the energy management system.

Another aspect of the present invention includes a method for augmenting an automatic generation control of an energy management system of a utility grid including the steps of establishing a unilateral communication between a utility grid energy management system and a wind plant control system of a wind plant, communicating a ramp rate signal from an automatic generation control of the utility grid energy management system in response to an area control error augmentation calculation performed by the automatic generation control to a wind plant supervisory control system, and communicating a request from the utility grid energy management system to the wind plant control system to curtail power as determined by the calculation of the unit control error in the area generation control.

An advantage of an embodiment of the present invention is that the system and method will allow integration of wind power plants into grids that may otherwise not be able to accept or increase power contribution from wind plants.

Another advantage of an embodiment of the present invention is that the system and method will enable a wind plant that would otherwise not be acceptable in a grid to participate in grid operations, including having a larger wind plant than would otherwise be allowed participate in the grid operations.

Another advantage of an embodiment of the present invention is the system and method will allow for wind plant owners to realize additional revenues from some grid ancillary service markets, such as regulation.

Another advantage of an embodiment of the present invention is that the system and method may increase the value of wind plant energy.

Another advantage of an embodiment of the present invention is that the system and method may be applicable to other equipment controls including but not limited to gas turbines and industrial controls.

Another advantage of an embodiment of the present invention is that the system and method is that the security of the grid may be improved.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention is related to a method for allowing active power functions presently available in a wind plant control systems to be called upon by a grid energy management system (EMS) to aid the EMS automatic generation control (AGC) in controlling grid parameters under certain conditions.

Figure 1:
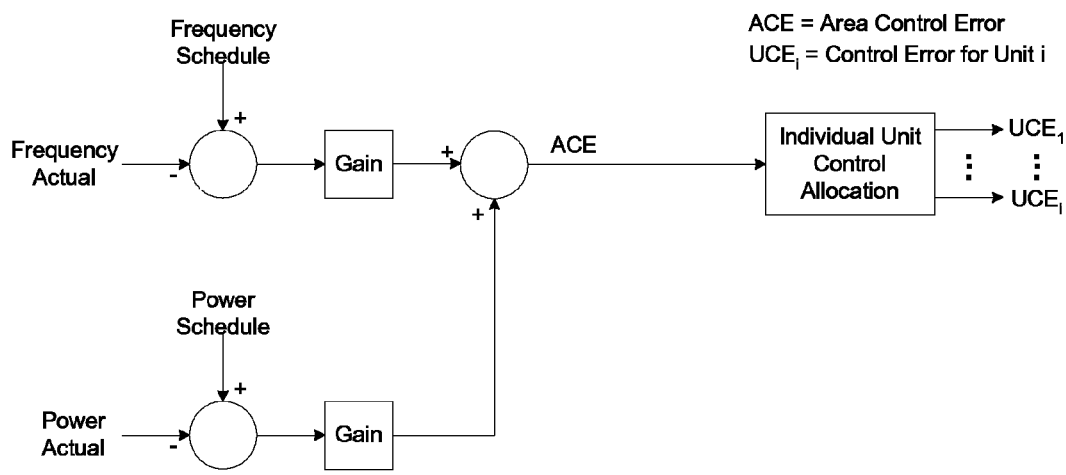
FIG. 1 is a schematic of a prior art method for automatic generation control.

A simplified diagram of a prior art method for AGC is shown in FIG. 1. The primary objectives of the AGC are to maintain frequency and power exchange between control areas by increasing and decreasing the power output of selected generation units. The AGC accomplishes this by calculating an Area Control Error (ACE) having two components. The first component of the ACE is the difference between scheduled and actual frequency, multiplied by an appropriate gain. The second component is the difference between scheduled and actual power exchange, multiplied by an appropriate gain. This ACE, which has units of MW, is then distributed to selected generating units for implementation. The individual signals distributed to each generating unit are called Unit Control Errors (UCEi).

As an example, assume that the actual frequency is equal to the scheduled frequency, the actual power exchange is 100 MW higher than the scheduled power exchange due to an unpredicted increase in wind generation, the gains are 1.0, and five generating units are selected to be under AGC control. In this example, under these assumed conditions, the ACE would be −100 MW. If the generating units under AGC control are of similar size, they share the duty equally with similar amplitude UCEi, and each generating unit would decrease power output by 20 MW. If the generating units are of different sizes, then each generating unit would be assigned different shares of the ACE, with larger units bearing more of the duty.

AGC units are generally required to implement the power output changes in a specified amount of time, e.g. 10 minutes. If the required rate of change exceeds the capability of the AGC unit, it will not be able to implement the change in the specified time. For example, assume an AGC unit needs to decrease 20 MW in 10 minutes, or 2 MW/min. If that unit had a maximum ramp rate of 1 MW/min, it would take 20 minutes to accomplish the 20 MW decrease, and the unit would be unable to meet the requested decrease in the allotted time.

The primary objective of the AGC augmentation according to the present invention is to assist the AGC units when they are at a down ramp rate limit by temporarily applying a limit to wind generation. However, the invention is also applicable to ramp up rate limits as well, with appropriate modification to the wind generation power reference.

Figure 2:
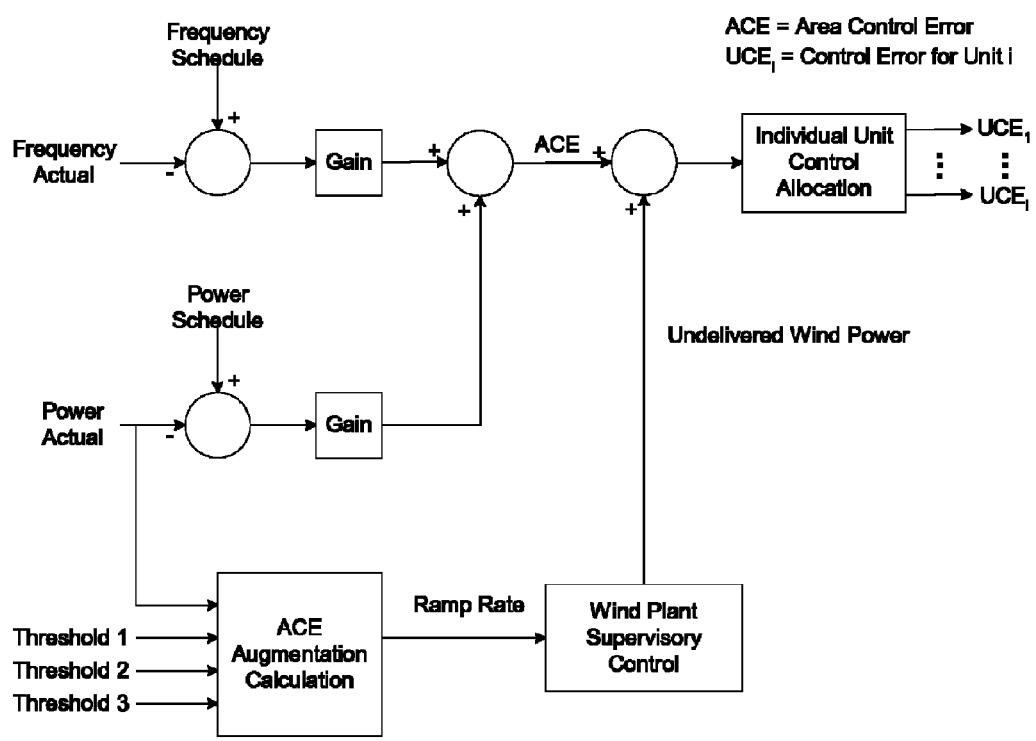
FIG. 2 is a flow chart showing an exemplary embodiment of bilateral communication between the grid operator and the wind plant.

An overview of the modified AGC system of the present invention is shown in FIG. 2. As can be seen in FIG. 2, the present invention provides an augmentation to the existing or nominal AGC of FIG. 1. The augmentation will be active when large increases in generation or decreases in load cause the power exchange to exceed specified threshold(s), which indicate that the ramp rate capability of the AGC units is insufficient. When that occurs, the modified AGC will perform an ACE augmentation calculation and send a ramp rate limit signal to the wind plant's supervisory control system. The supervisory control will distribute the limit signal to the individual wind turbine generators (WTGS) for implementation. The difference between the available wind power due to prevailing wind conditions and the wind power actually supplied with the AGC augmentation limit in effect is the undelivered wind power. This measurement is sent from the wind plant supervisory control back to the AGC where it is added to the nominal ACE to augment the UCEi signal sent to the AGC units. Thus, the AGC units will eventually respond to both the initial generation increase or load decrease as well as the temporary reduction in wind power output. This ensures that wind plant output is only constrained when the AGC units are at their ramp rate limits.

Figure 3:
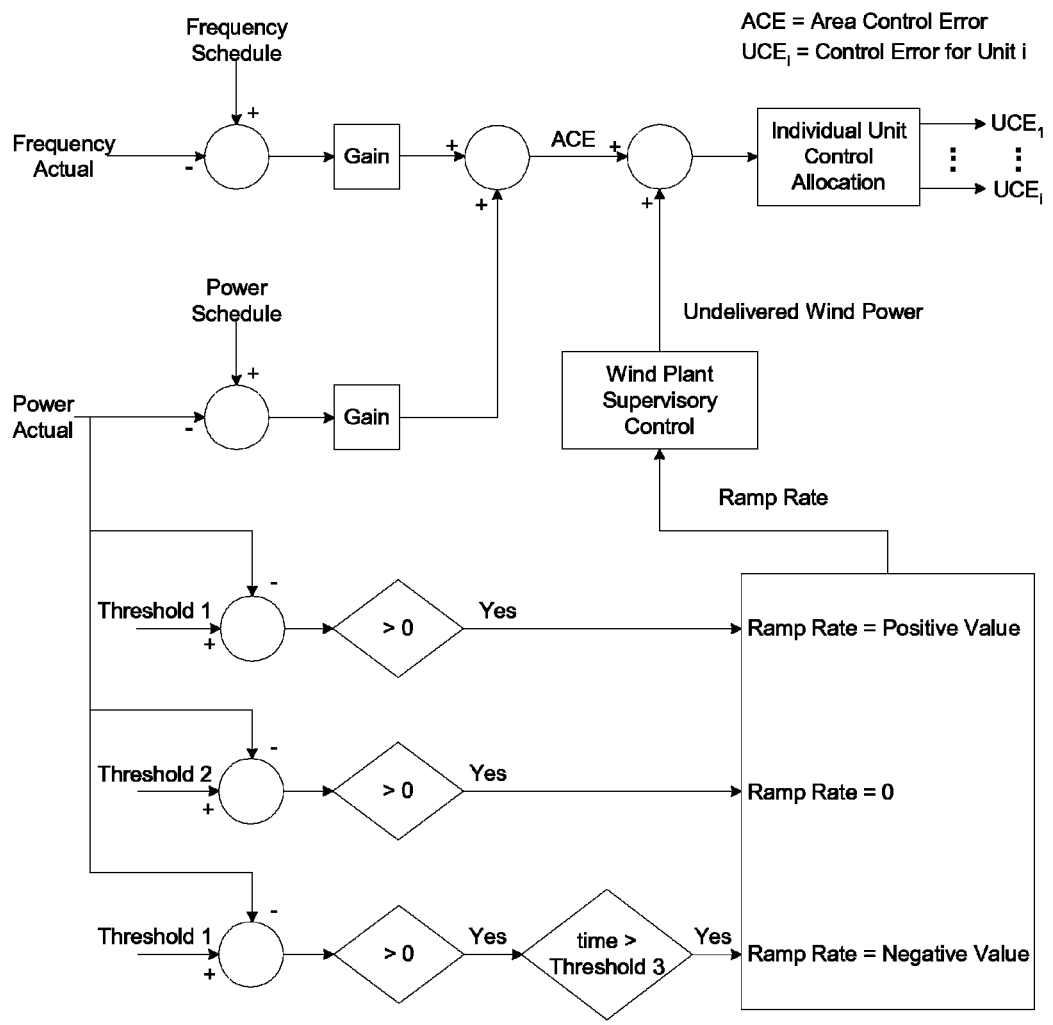
FIG. 3 is a flow chart showing another exemplary embodiment of bilateral communication between the grid operator and the wind plant.

One embodiment of the present invention is shown in FIG. 3. The augmentation will be activated when the actual power exchange exceeds threshold 1, resulting in a positive ramp rate limit on the wind plant(s). If the power exchange continues to increase and exceeds threshold 2, then a more severe constraint is applied—a zero ramp rate limit or cap. If the power exchange exceeds threshold 1 for a specified amount of time, e.g. threshold 3, then a negative ramp rate limit is sent to the wind plant to reduce power output. Once the power exchange falls below the thresholds, the ACE augmentation calculation will reset and the wind plant allowed to generate according to the available wind with no ramp rate limit.

Figure 4:
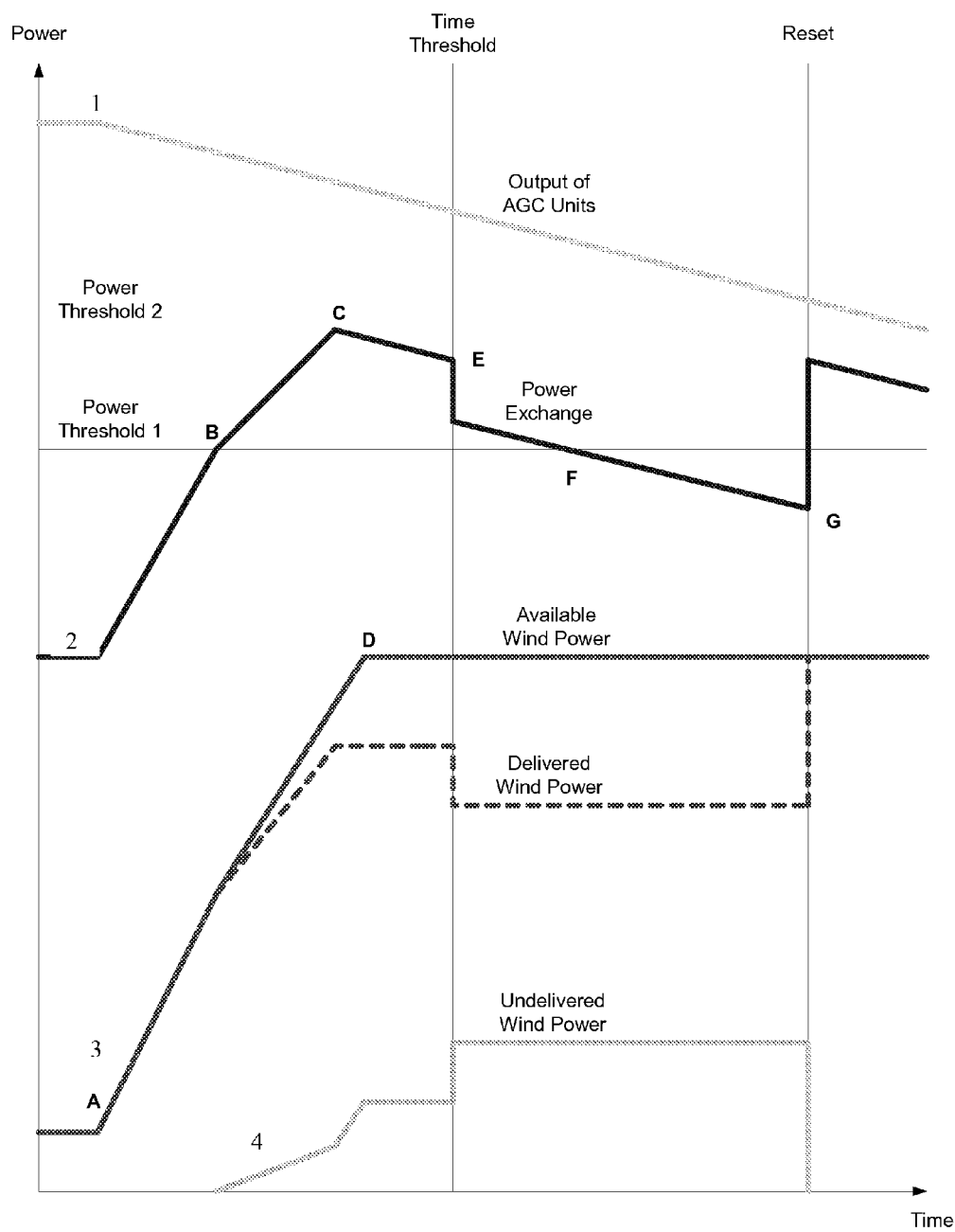
FIG. 4 is a plot of selected system variables as a function of time to illustrate the performance of the exemplary embodiment.

An example of this embodiment of the AGC augmentation method is shown in FIG. 4. In FIG. 4, line 1 represents the total power output of all units under AGC control. Line 2 represents the power exchange. Line 3 represents the total wind power available due to prevailing wind conditions. The dotted portion of line 3 represents the actual wind generation delivered after the application of ramp rate limits from the AGC augmentation. Line 4 represents the undelivered wind power, or the difference between the available and delivered wind power.

Initially, the power system is balanced with constant AGC unit output, constant power exchange and constant wind generation. At point A, the wind speed begins to increase. This results in an increase in both wind generation (line 3) and power exchange (line 2). As a result, the AGC acts to bring the power exchange back to the initial level by reducing the output of the AGC units (line 1). However, the maximum down ramp rate for the AGC units is less than the rate of increase in wind generation. Therefore, the power exchange continues to increase.

At point B, the power exchange exceeds the first power threshold and a positive ramp rate limit signal is sent to the wind plant(s). The implementation of this ramp rate limit reduces the wind generation from that available (line 3, solid) to that delivered (line 3, dotted). The difference between these two is the undelivered power signal (line 4) sent back to the AGC. The maximum down ramp rate for the AGC units is still less than the rate of increase in wind generation. Therefore, the power exchange (line 2) continues to increase.

At point C, the power exchange exceeds the second power threshold and a zero ramp rate limit or cap signal is sent to the wind plant(s). As a result, the delivered wind power (line 3, dotted) stops increasing, while the undelivered wind power (line 4) continues to increase.

At point D, the wind speed stops increasing, as does the available wind power (line 3, solid). Since the wind generation is already capped by the AGC augmentation control, there is no change in delivered wind power (line 3, dotted). However, the undelivered wind power (line 4) stops increasing. The AGC output (line 1) and the power exchange (line 2) continue to decrease.

At point E, the power exchange has exceeded the first power threshold for the specified time threshold. Therefore, a negative ramp rate or reduction signal is sent to the wind plant(s). As a result, the delivered wind power (line 3, dotted) is quickly reduced. This causes a step reduction in the power exchange (line 2) and an increase in the undelivered wind power (line 4). The AGC unit output (line 1) continues to decrease, causing a further decrease in the power exchange.

At point F, the power exchange falls below the first power threshold. In this example, it initiates a reset timer. There is no change in delivered (red dotted) or undelivered (green) wind power. However, the power exchange (blue) continues to fall as the AGC unit output continues to decrease (yellow).

At point G, the reset timer threshold is met and the limit on wind generation is removed. Thus, the delivered wind power (line 3, dotted) becomes the available wind power (line 3 solid), and the undelivered wind power (line 4) becomes zero. As a result, there is a step increase in the power exchange (line 2). The power exchange now exceeds the first power threshold again, triggering the AGC augmentation to send a positive ramp rate signal to the wind plant(s). However, the application of a positive ramp rate to the wind generation has no impact when the wind generation is constant. Therefore, the continued decrease in AGC unit output (line 1) is causing the subsequent decrease in power exchange. Different reset schemes could be devised to ensure that the removal of the limit on wind generation does not increase the power exchange beyond specified thresholds, or to implement the release of wind generation in stages.

This is only an example of one embodiment of the AGC augmentation. It is obvious to those skilled in the art that the selection of thresholds, timers, resets and other actions should be made to avoid instabilities, and that many other embodiments of this control could be devised.

Figure 5:
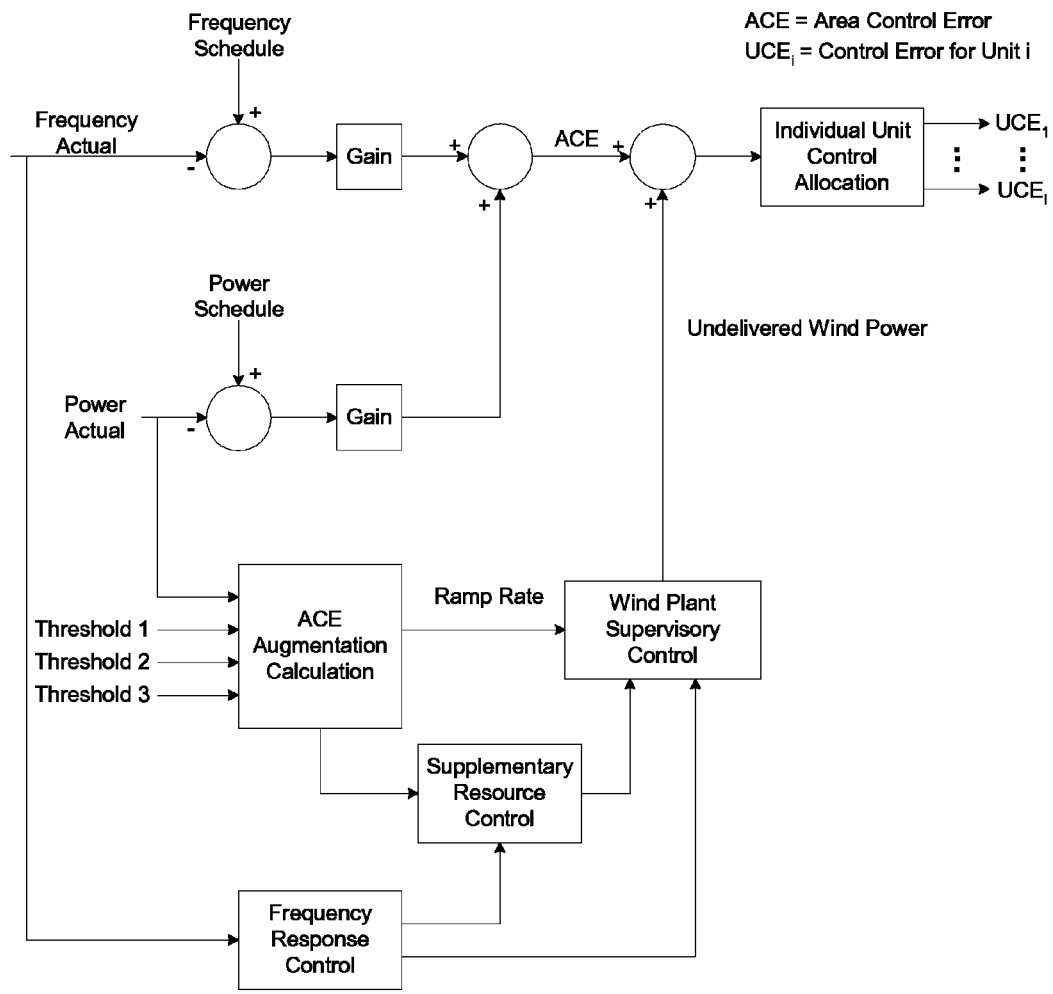
FIG. 5 is a flow chart showing another embodiment of bilateral communication between the grid operator and the wind plant.

FIG. 5 illustrates another exemplary embodiment of the AGC augmentation method according to the invention. In particular, the augmentation method may include a variety of controls in addition to the wind plant(s) supervisory control. For example, the augmentation method may include a supplementary resource, such as an energy storage or non-wind generation facility. If an energy storage facility, then limiting the wind plant(s) output could result in charging of the storage device. Depending upon the rating of that device, a signal representing any remaining undelivered wind power could be sent back to the AGC and added to the nominal ACE as described above. Similarly, a non-wind generation resource could be limited in addition to, in coordination with, or in place of the wind plant(s).

It should be appreciated by one of ordinary skill in the art, that as long as a wind plant(s) is generating as much energy as the wind makes possible, energy production can only move or be moved in a downward direction. Therefore, the augmentation method can only assist the AGC units when they are moving down in response to increasing generation or decreasing load. A non-wind generation resource with a conventional, controllable fuel source can respond in both directions. Such a supplementary resource could then provide assistance to the AGC units when they are moving up in response to decreasing generation or increasing load. Alternatively, a wind plant could be operating in a continuously curtailed mode, in which the generated wind power is less than the available wind power. Under such conditions, the wind plant could provide the same supplementary assistance as a separate resource.

In an alternative embodiment, the augmentation method may include a frequency response or active power control. Such a control could initiate a decrease in wind plant(s) output when the frequency exceeds a specified threshold, indicating a systemic increase in generation or decrease in load. If the wind plant(s) is initially curtailed, it will also have the ability to respond to a drop in frequency by increasing its output. As above, the wind plant and a supplementary resource could be coordinated such that either or both respond to the frequency control.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for augmenting an automatic generation control of an energy management system grid, comprising:
   establishing a bilateral communication between a grid energy management system and a wind plant control system of a wind plant;
   communicating a ramp rate signal from an automatic generation control of the grid energy management system in response to an area control error augmentation calculation performed by the automatic generation control to a wind plant supervisory control system; and
   communicating wind plant control active power functions from the wind plant control system to the energy management system;
   wherein the wind plant control active power functions include undelivered wind power.

2. The method of claim 1, wherein the ramp rate signal is a curtailment request.

3. The method of claim 1, further comprising adjusting wind plant active power functions at the wind plant in response to the automatic generation control ramp rate signal.

4. The method of claim 2, further comprising adjusting wind plant active power functions at the wind plant in response to the automatic generation control curtailment requests.

5. A method for augmenting an automatic generation control of an energy management system of a grid, comprising:
   establishing a unilateral communication between a grid energy management system and a wind plant control system of a wind plant;
   communicating a ramp rate signal from an automatic generation control of the grid energy management system in response to an area control error augmentation calculation performed by the automatic generation control to a wind plant supervisory control system; and
   communicating a request from the grid energy management system to the wind plant control system to curtail power as determined by a calculation of the area control error or the unit control error in the area generation control;
   wherein the ramp rate signal comprises ramp rate limits.

6. The method of claim 5, wherein the ramp rate signal further comprises plant curtailment controls.

* * * * *